United States Patent
Ma et al.

(10) Patent No.: US 12,519,684 B2
(45) Date of Patent: Jan. 6, 2026

(54) COMMUNICATION METHOD AND APPARATUS

(71) Applicant: HUAWEI TECHNOLOGIES CO., LTD., Guangdong (CN)

(72) Inventors: Qianli Ma, Chengdu (CN); Huang Huang, Shenzhen (CN); Kuandong Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 18/504,541

(22) Filed: Nov. 8, 2023

(65) Prior Publication Data

US 2024/0073076 A1 Feb. 29, 2024

Related U.S. Application Data

(63) Continuation of application No. PCT/CN2022/088848, filed on Apr. 24, 2022.

(30) Foreign Application Priority Data

May 10, 2021 (CN) .......................... 202110507432.1

(51) Int. Cl.
*H04L 27/26* (2006.01)

(52) U.S. Cl.
CPC ...... *H04L 27/2614* (2013.01); *H04L 27/2636* (2013.01)

(58) Field of Classification Search
CPC ............. H04L 27/2614; H04L 27/2636; H04L 27/26412; H04L 25/03828; H04L 25/03834
See application file for complete search history.

(56) References Cited

U.S. PATENT DOCUMENTS

2011/0255571 A1  10/2011  Caffrey et al.

FOREIGN PATENT DOCUMENTS

WO   2019238131 A1   12/2019
WO   2021027901 A1   2/2021

*Primary Examiner* — Betsy Deppe
(74) *Attorney, Agent, or Firm* — Rimon PC

(57) ABSTRACT

Embodiments of this application provide a communication method and apparatus. In the method, the first communication apparatus may receive a first message, where the first message includes information about an expansion factor. The first communication apparatus determines a quantity of information bits based on the expansion factor, generates a to-be-sent signal based on the quantity of information bits; and transmits the to-be-sent signal. During communication, the communication apparatus uses the expansion factor in transmission, so that the quantity of information bits transmitted in a filter can be increased, to ensure high spectrum utilization and high data transmission efficiency.

20 Claims, 3 Drawing Sheets

COMMUNICATION METHOD AND APPARATUS

CROSS-REFERENCE TO RELATED APPLICATIONS

This application is a continuation of International Application No. PCT/CN2022/088848, filed on Apr. 24, 2022, which claims priority to Chinese Patent Application No. 202110507432.1, filed on May 10, 2021. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

A signal of a wireless communication system can be transmitted for a longer distance only after undergoing power amplification. Due to limitations of technology and costs, a power amplifier usually performs linear amplification within a particular range beyond which the signal will be distorted. If the signal is distorted, the receiving end cannot correctly parse the signal. To meet a coverage requirement of the communication system, a signal generation technology with a low peak to average power ratio (PAPR) is usually required.

For discrete Fourier transform spread orthogonal frequency division multiplexing with frequency domain pulse shaping (DFT-s-OFDM-FDSS), spectrum replication is added after discrete Fourier transform (DFT), and then a filter is used to multiply a duplicated signal, thereby achieving an effect of frequency domain spectral shaping. Because spectral shaping is performed through DFT-S-OFDM-FDSS, a PAPR of a DFT-s-OFDM waveform can be reduced. However, for the DFT-s-OFDM-FDSS, although a lower PAPR is achieved, a bandwidth is expanded at the expense of transmission efficiency.

SUMMARY

This application provides a communication method and apparatus, to ensure better utilization of a spectrum without sacrificing a transmission bandwidth when a PAPR is low during communication transmission.

According to a first aspect, this application provides a communication method. The method may be applied to a first communication apparatus, or may be applied to a second communication apparatus, or may be implemented by interaction between a first communication apparatus and a second communication apparatus. The first communication apparatus may be equivalent to a terminal device, for example, user equipment (UE) or a vehicle-mounted device. The second communication apparatus may be equivalent to a transmission/reception point (TRP), a $5^{th}$ generation (5G) base station (gNodeB, gNB), or the like. This is not specifically limited in this application. When performing the communication method in this application, the second communication apparatus may first determine a first message. The first message includes information about an expansion factor. Then, the second communication apparatus may transmit the first message. Correspondingly, the first communication apparatus may receive the first message, determine a quantity of information bits based on the expansion factor, generate a to-be-sent signal based on the quantity of information bits, and transmit the to-be-sent signal. The second communication apparatus may receive the to-be-sent signal, demodulate the to-be-sent signal, and determine, based on the expansion factor, a quantity of information bits of the to-be-sent signal sent by the first communication apparatus.

It should be noted that transmission mentioned in this application may be understood as active sending, or may be understood as sending after receiving an instruction. For example, that the second communication apparatus transmits the first message may be understood as that the second communication apparatus actively sends the first message, or may be understood as that the second communication apparatus passively sends the first message after receiving an instruction of a network element of a core network, or the first message may be sent by the second communication apparatus after the first communication apparatus sends information about requesting for the first message to the second communication apparatus. A specific form of the transmission is not specifically limited in this application.

In this application, after the first communication apparatus receives the information about the expansion factor, during spectrum replication, the first communication apparatus may increase, based on the expansion factor, the quantity of information bits transmitted through a filter. The quantity of information bits transmitted through the filter is increased without sacrificing a bandwidth, and spectrum utilization can also be correspondingly improved.

In an optional implementation, the information about the expansion factor is an index value of the expansion factor.

It should be noted that there is a one-to-one correspondence between the index value of the expansion factor and a specific value of the expansion factor. The index value of the expansion factor may indicate the specific value of the expansion factor. For example, that the index value of the expansion factor is 0000 indicates that the expansion factor is 1, and that the index value of the expansion factor is 00001 indicates that the expansion factor is 11/10. This is not specifically limited in this application. Because the expansion factor is indicated by using a bit, compared with directly indicating the specific value of the expansion factor, indicating the specific value of the expansion factor by using the bit may occupy less memory during data transmission, so that the first communication apparatus or the second communication apparatus can use more data processing resources to perform data computation during data processing.

In some embodiments, the index value of the expansion factor may be indicated by using one or more bits. This is not specifically limited in this application.

In an optional implementation, the first message further includes information about a roll-off factor of a filter of the first communication apparatus. The expansion factor is in a one-to-one correspondence with the roll-off factor.

It should be noted that the first message includes the information about the roll-off factor of the filter of the first communication apparatus, so that the first communication apparatus calculates, when referring to the roll-off factor, the quantity of information bits based on the expansion factor. In this way, in a case in which the roll-off factor is determined, during the spectrum replication, the quantity of information bits that can be transmitted is increased without increasing the bandwidth, thereby improving spectrum utilization.

In an optional implementation, a value of the expansion factor is greater than a roll-off factor of a filter of the first communication apparatus.

In some embodiments, the value of the expansion factor is greater than the roll-off factor, so that during the spectrum replication, it can be ensured that the quantity of information bits transmitted is increased, thereby improving spectrum utilization.

In an optional implementation, the value of the expansion factor may be greater than or equal to a sum of the roll-off factor and a preset value.

It should be noted that in some embodiments, to ensure higher spectrum utilization efficiency, a relationship between the value of the expansion factor and the roll-off factor may be limited by using the preset value. Usually, the preset value is set to 1. However, in practical application, the preset value may be adjusted based on a user requirement. For example, the preset value is 1.1 or 0.9. This is not specifically limited in this application.

In an optional implementation, the information about the expansion factor may be indicated by using one or more of the following signaling:
radio resource control (RRC), a media access control control element (MAC CE), or downlink control information (DCI).

It should be noted that the RRC signaling, the MAC CE signaling, and the DCI are sent by using different layers (a control layer, a physical layer, and the like). Usually, the level of the RRC signaling is higher than that of the MAC CE signaling and the DCI, and the level of the MAC CE signaling is higher than that of the DCI. When the solution of this application is applied, the value of the expansion factor may be indicated by using any one of the foregoing signaling, or a range of the expansion factor may be indicated by using signaling of a high level, and the specific value of the expansion factor is indicated by using signaling of a low level. In this way, based on a transmission channel status, overheads can be reduced, scheduling flexibility can be improved, so that data transmission efficiency can be improved. For example, the second communication apparatus indicates a value range 1.1 to 1.3 of the expansion factor by using the RRC signaling, and indicates a value 1.2 of the expansion factor by using the DCI signaling. This is not limited in this application.

In an optional implementation, the first communication apparatus or the second communication apparatus may determine the quantity of information bits based on the expansion factor and at least one of the following parameters:
the roll-off factor of the filter of the first communication apparatus, a bandwidth of the first communication apparatus, a quantity of streams of the signal, or a modulation and coding scheme (MCS).

It should be noted that in this application, when the quantity of information bits is determined, when the expansion factor is referenced, the parameters such as the roll-off factor of the filter of the first communication apparatus, the bandwidth of the first communication apparatus, the quantity of the streams of the signal, and the MCS are further referenced, so that reliability of a calculated quantity of data bits is higher. In addition, on the premise that data transmission exists between the first communication apparatus and the second communication apparatus, the parameters used by the first communication apparatus to determine the quantity of information bits are also used by the second communication apparatus to determine the quantity of information bits. This may be agreed in advance by using a communication protocol. Alternatively, the second communication apparatus may directly indicate which parameters are used by the first communication apparatus to determine the quantity of information bits to determine. Alternatively, after the first communication apparatus determines the quantity of information bits, when the first communication apparatus generates the to-be-sent signal based on the quantity of information bits and transmits the to-be-sent signal, the first communication apparatus carries indication information of the parameters for determining the quantity of information bits, so that the second communication apparatus knows which parameters are used to determine the quantity of information bits. There may be other manners. This is not specifically limited in this application.

In an optional implementation, the first communication apparatus or the second communication apparatus may determine the quantity of information bits by using the following formula:

$$N_{info} = \text{int}\left(\frac{N_{RE} \cdot R \cdot Q_m \cdot v}{\lambda + \alpha} \cdot \beta\right)$$

$N_{info}$ represents the quantity of information bits, $N_{RE}$ represents a quantity of resource elements (REs), $\beta$ represents the expansion factor, $\alpha$ represents the roll-off factor, R represents a bit rate, $Q_m$ represents a modulation order, v represents a quantity of streams of the signal and represents the preset value, $\lambda$ represents the preset value, and int( ) represents rounding up, rounding down, or rounding off.

It should be noted that the foregoing formula is merely a manner of calculating the quantity of information bits. In practical application, there may be another calculation manner. A manner of calculating the quantity of information bits falls within the protection scope of this application provided that the expansion factor is referenced in the manner.

In an optional implementation, the second communication apparatus indicates a bandwidth for actually transmitting data by the first communication apparatus. Usually, a bandwidth size is represented by using $N_{RE}$. $N_{RE}$ indicates a quantity of resource elements within a given quantity of continuous OFDM symbols. One resource element is one subcarrier in one OFDM symbol. Assuming that the quantity of the continuous OFDM symbols is given as K, a quantity of subcarriers in each OFDM is $N_{BW}=N_{RE}/K$, a subcarrier spacing of a system is SCS, and the bandwidth is $BW=SCS \cdot N_{BW}$. Therefore, it can be learned that a system bandwidth may be derived by using $N_{RE}$, that is, may be represented by using $N_{RE}$. $N_{RE}$ may be determined by using the following formula:

$$N_{RE}=\text{int}(\min(N1,N'_{RE}) \cdot n_{PRB} \cdot (\lambda+\alpha))$$

$N'_{RE}$ represents a quantity of REs in one physical resource block (PRB), $n_{PRB}$ represents a quantity of PRBs occupied by a bandwidth required by a modulation signal, and N1 represents a constant factor or a limitation factor agreed upon between the first communication apparatus and the second communication apparatus.

In this way, the quantity of the REs is determined in consideration of a case in which the second communication apparatus indicates only the bandwidth for actually transmitting data by the first communication apparatus. This is more comprehensive.

In an optional implementation, the first communication apparatus or the second communication apparatus may further determine a quantity of modulation symbols by using the following formula:

$$N_{sym} = \text{int}\left(\frac{N_{RE} \cdot v}{\lambda + \alpha} \cdot \beta\right)$$

$N_{sym}$ represents the quantity of the modulation symbols, $N_{RE}$ represents a quantity of resource elements (REs), $v$ represents a quantity of streams of the signal, $\beta$ represents the expansion factor, and $\alpha$ represents the roll-off factor.

It should be noted that in practical application, the first communication apparatus or the second communication apparatus may first determine the quantity of information bits, map the information bits into the modulation symbols, and transmit the modulation symbols through a channel to transmit information, or may first determine the quantity of the modulation symbols, and adjust the quantity of information bits based on the determined quantity of the modulation symbols to transmit information. This application does not specifically limit whether the quantity of information bits is first determined, or the quantity of the modulation symbols is first determined.

According to a second aspect, this application provides a first communication apparatus, including an input/output unit (e.g., an input/output circuit) and a processing unit (e.g., a processing circuit).

The input/output unit is configured to receive a first message. The first message includes information about an expansion factor. The processing unit is configured to determine a quantity of information bits based on the expansion factor, and generate a to-be-sent signal based on the quantity of information bits. The input/output unit is further configured to transmit the to-be-sent signal.

In an optional implementation, the information about the expansion factor is an index value of the expansion factor.

In an optional implementation, the first message further includes information about a roll-off factor of a filter of the first communication apparatus. The expansion factor is in a one-to-one correspondence with the roll-off factor.

In an optional implementation, a value of the expansion factor is greater than a roll-off factor of a filter of the first communication apparatus.

In an optional implementation, the value of the expansion factor is greater than or equal to a sum of the roll-off factor and a preset value.

In an optional implementation, the information about the expansion factor is indicated by using one or more of the following signaling: RRC, a MAC CE, or DCI.

In an optional implementation, the processing unit is configured to determine the quantity of information bits based on the expansion factor and at least one of the following parameters: the roll-off factor of the filter of the first communication apparatus, a bandwidth of the first communication apparatus, a quantity of streams of the signal, or an MCS.

In an optional implementation, the processing unit is configured to determine the quantity of information bits by using the following formula:

$$N_{info} = \text{int}\left(\frac{N_{RE} \cdot R \cdot Q_m \cdot v}{\lambda + \alpha} \cdot \beta\right)$$

$N_{info}$ represents the quantity of information bits, $N_{RE}$ represents a quantity of REs, $\beta$ represents the expansion factor, $\alpha$ represents the roll-off factor, R represents a bit rate, $Q_m$ represents a modulation order, $v$ represents a quantity of streams of the signal, $\lambda$ represents the preset value, and int( ) represents rounding up, rounding down, or rounding off.

According to a third aspect, this application provides a second communication apparatus, including a processing unit and an input/output unit.

The processing unit is configured to determine a first message. The first message includes information about an expansion factor. The input/output unit is configured to transmit the first message.

In an optional implementation, the information about the expansion factor is an index value of the expansion factor.

In an optional implementation, the first message further includes information about a roll-off factor of a filter of a first communication apparatus. The expansion factor is in a one-to-one correspondence with the roll-off factor.

In an optional implementation, a value of the expansion factor is greater than a roll-off factor of a filter of a first communication apparatus.

In an optional implementation, the value of the expansion factor is greater than or equal to a sum of the roll-off factor and a preset value.

In an optional implementation, the information about the expansion factor is indicated by using one or more of the following signaling: RRC, a MAC CE, or DCI.

In an optional implementation, the processing unit is configured to determine a quantity of information bits based on the expansion factor and at least one of the following parameters: the roll-off factor of the filter of the first communication apparatus, a bandwidth of the first communication apparatus, a quantity of streams of a signal, or a modulation and coding scheme (MCS).

In an optional implementation, the processing unit is configured to determine a quantity of information bits by using the following formula:

$$N_{info} = \text{int}\left(\frac{N_{RE} \cdot R \cdot Q_m \cdot v}{\lambda + \alpha} \cdot \beta\right)$$

$N_{info}$ represents the quantity of information bits, $N_{RE}$ represents a quantity of resource elements (REs), $\beta$ represents the expansion factor, $\alpha$ represents the roll-off factor, R represents a bit rate, $Q_m$ represents a modulation order, $v$ represents a quantity of streams of a signal, $\lambda$ represents the preset value; and int( ) represents rounding up, rounding down, or rounding off.

According to a fourth aspect, this application provides a communication apparatus, including at least one processor and a memory. The memory is configured to store a computer program or instructions. When the apparatus runs, the at least one processor executes the computer program or the instructions, to enable the communication apparatus to perform the method according to the first aspect or embodiments of the first aspect.

According to a fifth aspect, an embodiment of this application provides another communication apparatus, including an interface circuit and a logic circuit. The interface circuit may be understood as an input/output interface. The logic circuit may be configured to run code instructions to perform the method in the first aspect or embodiments of the first aspect.

According to a sixth aspect, this application further provides a computer-readable storage medium. The computer-readable storage medium stores computer-readable instructions. When the computer-readable instructions are run on a computer, the computer is enabled to perform the method according to any one of the first aspect or possible designs of the first aspect.

According to a seventh aspect, this application provides a computer program product including instructions. When the computer program product runs on a computer, the computer is enabled to perform the method according to the first aspect or embodiments of the first aspect.

According to an eighth aspect, this application provides a chip system. The chip system includes a processor, and may further include a memory. The chip is configured to implement the method in any one of the first aspect or possible designs of the first aspect. The chip system may include a chip, or may include a chip and another discrete component.

According to a ninth aspect, this application provides a communication system. The system includes a first communication apparatus and a second communication apparatus. The communication system is configured to perform the method according to any one of the first aspect or possible designs of the first aspect.

For technical effects that can be achieved in the second aspect to the ninth aspect, refer to descriptions of technical effects that can be achieved in corresponding possible design solutions in the first aspect. Details are not described herein again in this application.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In descriptions of this application, unless otherwise specified, "a plurality of" means two or more than two. Therefore, for implementation of the apparatus and the method, reference may be made to each other, and repeated parts are not described again.

A communication method provided in embodiments of this application may be applied to a 5G communication system or various future communication systems, specifically, three most typical communication scenarios of the 5G communication system, for example, enhanced mobile broadband (eMBB), massive machine type communications (mMTC), and ultra-reliable and low latency communications (URLLC).

The following describes a communication system applicable to the communication method in this application. In the communication system, a first communication apparatus may be an access network device, and a second communication apparatus may be a terminal device. This is not specifically limited in practical application in this application. The following describes, with reference to FIG. 1A and FIG. 1B, a communication system which may be applicable to this application by using an example in which a first communication apparatus is a terminal device and a second communication apparatus is an access network device.

Figure 1A:
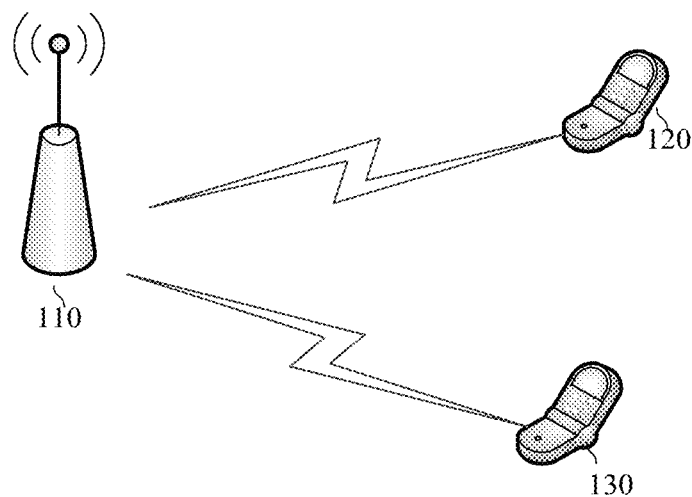
FIG. 1A is a schematic diagram of a communication system according to an embodiment of this application.

FIG. 1A shows a communication system 100 applicable to this application. The communication system 100 includes an access network device 110, a terminal device 120, and a terminal device 130. That the access network device 110 sends data to the terminal device 110 or the terminal device 120 may be understood as downlink data transmission. FIG. 1A schematically shows a communication system for downlink communication.

Figure 1B:
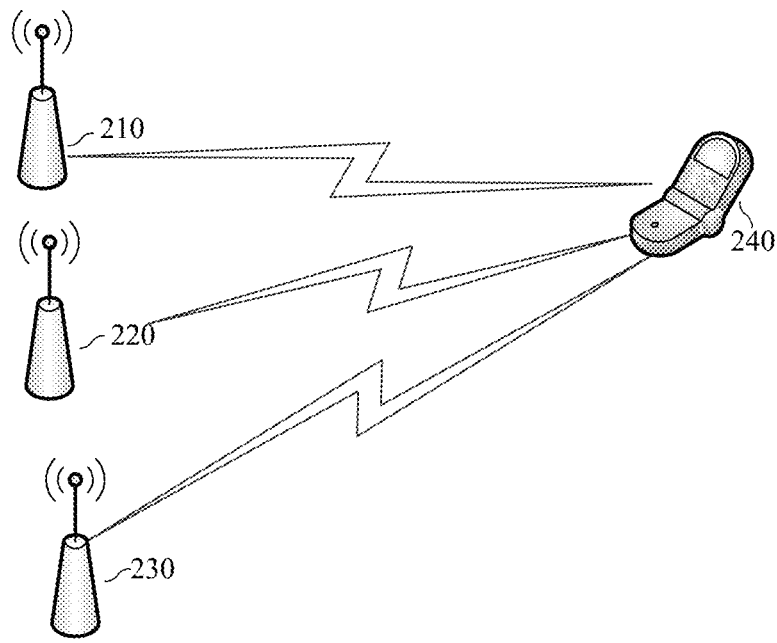
FIG. 1B is a schematic diagram of another communication system according to an embodiment of this application.

FIG. 1B shows another communication system 200 applicable to this application. The communication system 200 includes an access network device 210, an access network device 220, an access network device 230, and a terminal device 240. That the terminal device 240 sends data to the access network device 210 may be understood as uplink data transmission. FIG. 1B schematically shows a communication system for uplink communication.

The communication method provided in this application may be applicable to the communication system for the downlink communication shown in FIG. 1A, and may alternatively be applicable to the communication system for the uplink communication shown in FIG. 1B. This is not specifically limited in this application.

An access network device is an apparatus that is deployed in a radio access network and that provides a wireless communication function for a terminal device. The access network device has a device with a wireless sending/receiving function or a chip that can be disposed in the device. The device includes but is not limited to: an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (BBU), an access point (AP) in a wireless fidelity (Wi-Fi) system, a wireless relay node, a wireless backhaul node, a transmission point (transmission/reception point, TRP, or transmission point, TP), or the like. Alternatively, the device may be a gNB in a 5G (for example, new radio (NR)) system, a transmission point (TRP or TP), one or a group of (including a plurality of antenna panels) antenna panels of a base station in the 5G system, or a network node that forms a gNB or a transmission point, for example, a baseband unit (BBU), a distributed unit (DU), or a satellite.

In some deployments, the gNB may include a central unit (CU) and a DU. The gNB may further include a radio frequency unit (RU). The CU implements some functions of the gNB, and the DU implements some functions of the gNB. For example, the CU implements functions of an RRC layer and a packet data convergence protocol (PDCP) layer, and the DU implements functions of a radio link control (RLC) layer, a media access control (MAC) layer, and a physical (PHY) layer. Information at the RRC layer is finally changed to information at the PHY layer (that is, sent by using the PHY layer), or is converted from information at the PHY layer. Therefore, in this architecture, higher layer signaling, for example, RRC layer signaling or PDCP layer signaling, may also be considered to be sent by the DU, or sent by the DU and the RU. It may be understood that the access network device may be a CU node, a DU node, or a device including a CU node and a DU node. In addition, the CU may be classified as a network device in the radio access network (RAN), or the CU may be classified as a network device in a core network CN. This is not limited herein.

The terminal device in embodiments of this application may also be referred to as a terminal, and is an entity configured to receive or transmit a signal on a user side, and is configured to send an uplink signal to a network device, or receive a downlink signal from a network device, including a device that provides a user with voice and/or data connectivity, for example, may include a handheld device with a wireless connection function, or a processing device connected to a wireless modem. The terminal device may communicate with the core network by using the RAN, and exchange voice and/or data with the RAN. The terminal device may include user equipment (UE), a vehicle wireless communication technology (vehicle to X, V2X) terminal device, a wireless terminal device, a mobile terminal device, a device-to-device communication (D2D) terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, or user device, a wearable device, a vehicle-mounted device, or the like.

As an example instead of a limitation, in embodiments of this application, the terminal device may alternatively be a wearable device. The wearable device may also be referred to as a wearable intelligent device, an intelligent wearable device, or the like, and is a general term of wearable devices that are developed by using a wearable technology to perform intelligent design on daily wearing, such as glasses, gloves, watches, clothing, and shoes. The wearable device is a portable device that is directly worn on a body or integrated into a user's clothes or accessories. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application functions and need to work with other devices such as smartphones, such as various smart bands, smart helmets, or smart jewelries for monitoring physical signs.

If various terminal devices described above are located on a vehicle (for example, placed in the vehicle or installed in the vehicle), the terminal devices may be considered as vehicle-mounted terminal devices. A vehicle-mounted terminal device is, for example, also referred to as an on-board unit (OBU).

In descriptions of embodiments of this application, "and/or" describes an association relationship between associated objects and represents that three relationships may exist. For example, A and/or B may represent the following three cases: Only A exists, both A and B exist, and only B exists. A character "/" generally represents an "or" relationship between the associated objects. In this application, at least one means one or more than one, and a plurality of means two or more than two. In addition, it should be understood that in descriptions of this application, terms "first" and "second" are only used to distinguish the purpose of the descriptions, but cannot be understood as an indication or implication of relative importance, and cannot be understood as an indication or implication of a sequence.

The background part of this application mentions that a signal with a low PAPR may be obtained by using DFT-s-OFDM with FDSS. When performing uplink data transmission, the terminal device may generate a to-be-sent signal via the following steps:

Step 1: Modulate data bits. The data bits may be encoded data bits, or may be original data bits. A specific coding manner is not limited herein. A scheme used by modulation may be various modulation schemes, for example, amplitude modulation keying, phase shift keying, frequency shift keying, any modulation scheme in quadrature amplitude modulation (QAM), or any modulation scheme in offset quadrature amplitude modulation (OQAM).

Step 2: Convert a time-domain signal into a frequency-domain signal, that is, perform fast Fourier transform (FFT) or discrete Fourier transform (DFT) on a signal. If the signal is a QAM signal, the time-domain signal may be replicated, that is, upsampling is performed on the signal, and then the signal is transformed to a frequency domain. Alternatively, the QAM signal may be directly transformed to the frequency domain, and then replication is performed. A specific implementation is not limited in this application.

Step 3: Filter the frequency-domain signal. A filter used for filtering may be a Nyquist (Nyquist) filter, or may be a non-Nyquist filter. This is not specifically limited herein. In an implementation, step 3 may be performed before step 2. If step 3 is performed before step 2, the filtering is time-domain filtering. The time-domain filtering is to convolute the time-domain signal and a time-domain filter. If step 3 is performed after step 2, the filtering is frequency-domain filtering. For the frequency-domain filtering, the frequency-domain signal is multiplied by a signal in a frequency-domain filter in a one-to-one manner.

Step 4: Map the frequency-domain signal to a corresponding subcarrier location. The subcarrier location may be a subcarrier location allocated by a base station, or may be a subcarrier location allocated by the communication system.

Step 5: Perform inverse fast Fourier transform (IFFT) on the frequency-domain signal, transform the frequency-domain signal to a time domain, and then add a cyclic prefix (CP) for sending.

Figure 2:
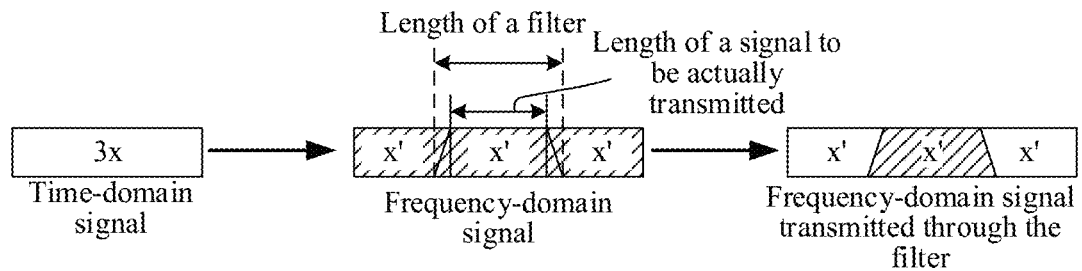
FIG. 2 is a schematic diagram of transmission of a frequency-domain signal.

For conventional DFT-s-OFDM-FDSS, x modulated signals may be replicated into three parts, that is, three-fold upsampling is performed on the modulated signals, and then FFT is performed on the modulated signals, to convert the modulated signals to frequency domain to obtain a frequency-domain signal. In the foregoing step 3, the frequency-domain signal includes three identical frequency-domain signal segments, and the frequency-domain filtering is performed on the frequency-domain signal, that is, point multiplication is performed in a one-to-one correspondence with the frequency-domain filter, as shown in FIG. 2. It should be noted that a length value of the frequency-domain filter is greater than a length value of a data signal. A ratio of the part of the length value of the frequency-domain filtering that exceeds the data signal to the data signal is denoted as α (that is, a roll-off factor of the filter). In this case, a length of the filter is x·(1+α). Finally transmitted data is data within dashed lines, and a length of the data is x·(1+α), that is, the length of the filter. However, a length of data that actually includes information is x. Therefore, compared with the DFT-s-OFDM, the DFT-s-OFDM-FDSS occupies wider bandwidth to transmit same data, therefore, spectrum utilization is low.

Figure 3:
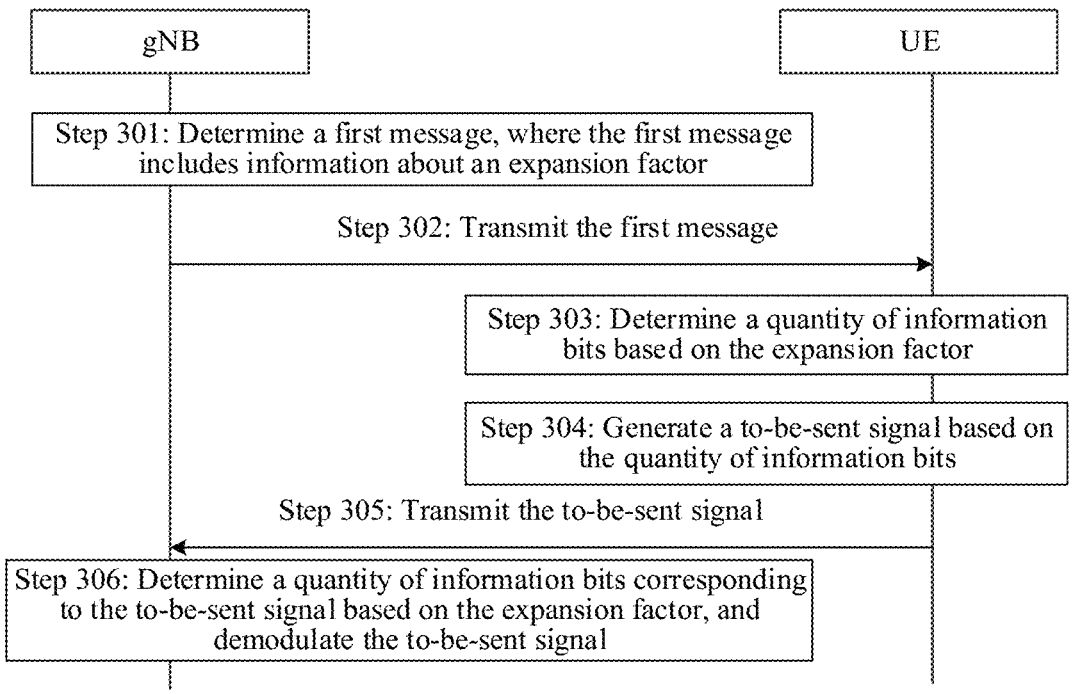
FIG. 3 is a schematic flowchart of a communication method according to an embodiment of this application.

Considering that DFT-s-OFDM with FDSS signals have a low PAPR but low frequency utilization in related technologies, in this application, an expansion factor is introduced, so that during spectrum replication, the quantity of information bits transmitted through a filter may be increased based on the expansion factor. The quantity of information bits transmitted through the filter is greater without sacrificing bandwidth resources, thereby improving spectrum utilization. This may be implemented by a communication method shown in FIG. 3. The method may be applied to a first communication apparatus, or may be applied to a second communication apparatus, or may be implemented by interaction between a first communication apparatus and a second communication apparatus. This is not specifically limited in this application. FIG. 3 shows only one first communication apparatus and one second communication apparatus. However, in practical application, quantities of the first communication apparatus and the second communication apparatus are not limited. The following describes the solution of this application by using an example in which the first communication apparatus is UE and the second communication apparatus is a gNB. For example, in uplink communication, the following steps may be performed:

Step 301: A gNB determines a first message, where the first message includes information about an expansion factor.

It should be noted that a gNB with a large data computation granularity may determine the information about the expansion factor (a value of the expansion factor, which parameters the expansion factor is associated with, and the like) through statistical analysis, based on past communication between a plurality of UEs and the gNB. The information may be determined based on an artificial intelligence (AI) algorithm, or may be determined based on another algorithm. This is not specifically limited in this application. In addition, the information about the expansion factor may alternatively be calculated by using a core network device that communicates with the gNB (in which the calculation may be performed in the foregoing manner, and details are not described herein), and then the core network device transmits the information about the expansion factor to the gNB. The source and determining manner of the information about the expansion factor are not specifically limited in this application.

In addition, it should be further noted that in addition to the information about the expansion factor, the first message may further carry other information. If the gNB sends the first message by broadcasting, the first message may further carry UE identification information, where the carried UE identification information indicates which UE performs a subsequent calculation operation based on the expansion factor. Alternatively, if the gNB sends the first message in a multicast mode, the first message may further carry cell identification information, where the carried cell identification information indicates a specific cell in which a subsequent calculation operation is performed based on the expansion factor. If the gNB sends the first message in a unicast mode, the first message may further carry signal transmission time indication information, where the carried signal transmission time indication information indicates when the UE transmits a to-be-sent signal to the second communication apparatus after performing a subsequent calculation operation based on the expansion factor. The first message may carry the UE identification information, the signal transmission time indication information, the cell identification information, and the like. This is not specifically limited in this application.

In addition, it should be further noted that the information about the expansion factor may be flexibly adjusted with a change of a communication service, for example, periodically updated, or adjusted based on a preset parameter value. For example, the gNB 1 determines an expansion factor A based on past communication between UE 1 to UE 10 (located in a same working campus in a same area) and the gNB 1, and may indicate the expansion factor A to the UE 1 to the UE 10, to enable the UE 1 to the UE 10 to communicate with the gNB 1. However, when geographical locations of the UE 1 to the UE 10 change, the gNB 1 needs to update the expansion factor A to ensure normal communication with the UE 1 to the UE 10. In addition, although the expansion factor A is determined by the gNB 1, in an actual communication process between each UE and the gNB 1, a communication effect is poor. Therefore, the value of the expansion factor may be adjusted based on an initial value or another parameter value of the expansion factor A. Specifically, how to adjust the expansion factor is determined according to an actual service. This is not specifically limited in this application.

For example, the information about the expansion factor may be an index value of the expansion factor. There is a one-to-one correspondence between the index value of the expansion factor and a specific value of the expansion factor. The specific value of the expansion factor may be indicated by using an index value. This is not specifically limited in this application. The index value of the expansion factor may be indicated using one or more bits. This is not specifically limited in this application. Because the expansion factor is indicated by using a bit, compared with directly indicating the specific value of the expansion factor, indicating the specific value of the expansion factor by using the bit may occupy less memory during data transmission, so that the first communication apparatus or the second communication apparatus can use more data processing resources to perform data computation during data processing.

As shown in Table 1, four bits may be used to indicate the index value of the expansion factor. That the index value of the expansion factor is 0000 indicates that the expansion factor is 1; that the index value of the expansion factor is 0001 indicates that the expansion factor is 11/10; and so on. This is merely an example description in this application, and further details are not provided. In addition, it should be further noted that only one or more rows in Table 1 may be used in practical application.

TABLE 1

| Index value (Index) of expansion factor | Expansion factor β |
|---|---|
| 0000 | 1 |
| 0001 | 11/10 |
| 0010 | 6/5 |
| ... | ... |

Step 302: The gNB transmits the first message. Correspondingly, the UE receives the message from the gNB.

It should be noted that transmission mentioned in this application may be understood as active sending, or may be understood as sending after receiving an instruction. For example, that the gNB transmits the first message may be understood as that the gNB actively sends the first message, or may be understood as that the gNB passively sends the first message after receiving an instruction of a network element of a core network, or the first message may be sent by the gNB after the UE sends information about requesting for the first message to the gNB. A specific form of the transmission is not specifically limited in this application.

In an optional implementation, the first message may further include information about a roll-off factor of a filter of the UE. The expansion factor β is in a one-to-one correspondence with the roll-off factor α. The first message includes the information about the roll-off factor of the filter of the first communication apparatus, so that the first communication apparatus can calculate, based on the roll-off factor, the quantity of information bits based on the expansion factor. In this way, in a case in which the roll-off factor is determined, during the spectrum replication, the quantity of information bits that can be transmitted is larger without increasing the bandwidth, thereby improving spectrum utilization.

For example, when the roll-off factor α is 0.2, the expansion factor β may be 1, 11/10, 8/7, 9/8, 10/9, 12/11, 13/12, or the like. In addition, when the first message includes the roll-off factor α, values of the expansion factor β and the roll-off factor α may be indicated by using the foregoing index value of the expansion information. Specifically, refer to Table 2 for indications. That the index value of the expansion factor is 0000 indicates that the roll-off factor α is 0 and the expansion factor β is 1; that the index value of the expansion factor is 0001 indicates that the roll-off factor α is 0.2 and the expansion factor is 1; that the index value of the expansion factor is 0011 indicates that the roll-off factor α is 0.2 and the expansion factor is 11/10; and so on. This is merely an example description, and further details are not provided. In addition, it should be further noted that in practical application, only one or more rows of Table 2 may be used, or one of the roll-off factor and the expansion factor in Table 2 is fixed. In this way, Table 2 may be changed from three columns to two columns. For example, when the roll-off factor is only 0.2, only the value of the expansion factor may be indicated, and Table 2 is changed to two columns. Alternatively, when the expansion factor is 11/10, only values 0.2 and 0.3 of the roll-off factor are indicated. In this case, Table 2 may be changed into two columns. This is merely an example description, and the form and content of the table are not specifically limited. Any manner in which the expansion factor and the roll-off factor can be indicated is applicable to this application.

TABLE 2

| Index value (Index) of expansion factor | Roll-off factor α | Expansion factor β |
|---|---|---|
| 0000 | 0 | 1 |
| 0001 | 0.2 | 1 |
| 0010 | 0.2 | 11/10 |
| 0011 | 0.2 | 8/7 |
| 0100 | 0.2 | 9/8 |
| 0101 | 0.2 | 10/9 |
| 0110 | 0.2 | 12/11 |
| 0111 | 0.2 | 13/12 |
| 1000 | 0.3 | 1 |
| 1001 | 0.3 | 6/5 |
| 1010 | 0.3 | 11/10 |
| 1011 | 0.3 | 8/7 |
| 1100 | 0.3 | 9/8 |
| 1101 | 0.3 | 10/9 |
| 1110 | 0.3 | 12/11 |
| 1111 | 0.3 | 13/12 |

It should be further noted that in practical application, the roll-off factor α and the expansion factor β may alternatively be separately indicated. To be specific, the roll-off factor and the expansion factor are separately indicated by using different signaling or information sent at different moments. For example, the information about the expansion factor is indicated by using RRC signaling, and the roll-off factor is indicated by using MAC CE signaling; the information about the expansion factor is indicated by using RRC signaling sent at a first moment, and the roll-off factor is indicated by using RRC signaling sent at a second moment. This is not specifically limited in this application.

In addition, values of different roll-off factors may further indicate values of different expansion factors. For example, when α=0.2, β may be some or all values of 1, 11/10, 8/7, 9/8, 10/9, 12/11, 13/12, or β may be indicated by using different bits. For example, the foregoing seven values of the β may be indicated by using three bits, or any four of the foregoing seven values of the β may be indicated by using two bits. This is not specifically limited in this application.

In addition, in considering a transmission manner of the first message, the expansion factors indicated by different bits may be flexibly selected in an instruction to the UE to perform an information bits calculation operation. It is assumed that the first message is sent in a multicast mode, and there are exactly four cells that communicate with the gNB. The expansion factor corresponding to the UE in each cell may be indicated by using two bits. For example, 11 indicates that an expansion factor corresponding to UE in a cell 4 is 11/10. This is not specifically limited in this application, and may be flexibly adjusted according to an actual service.

For example, the value of the expansion factor is greater than the roll-off factor of the filter of the UE. The value of the expansion factor is greater than the roll-off factor, so that during the spectrum replication, it can be ensured that the quantity of information bits transmitted is increased, thereby improving spectrum utilization.

For example, the value of the expansion factor may be greater than or equal to a sum of the roll-off factor and a preset value. To ensure higher spectrum utilization efficiency, a relationship between the value of the expansion factor and the roll-off factor may be limited by using the preset value. Usually, the preset value may be 1. However, in practical application, the preset value may be adjusted based on a user requirement. For example, the preset value is 1.1 or 0.9. This is not specifically limited in this application.

In an optional implementation, the information about the expansion factor may be indicated by using one or more of the following signaling: RRC, a MAC CE, or DCI. The RRC signaling, the MAC CE signaling, and the DCI are sent by using different layers (a control layer, a physical layer, and the like). Usually, the level of the RRC signaling is higher than that of the MAC CE signaling and the DCI, and the level of the MAC CE signaling is higher than that of the DCI. When the solution of this application is applied, the value of the expansion factor may be indicated by using any one of the foregoing signaling, or a range of the expansion factor may be indicated by using signaling of a high level, and the specific value of the expansion factor is indicated by using signaling of a low level. For example, the gNB indicates a value range 1.1 to 1.3 of the expansion factor by using the RRC signaling, and indicates a value 1.2 of the expansion factor by using the DCI signaling or the MAC CE signaling. Alternatively, the gNB indicates a value range 1.1 to 1.3 of the expansion factor by using the MAC CE signaling, and indicates a value 1.2 of the expansion factor by using the DCI signaling. This is not limited in this application. In this way, based on a transmission channel status, flexible scheduling may be performed, so that data transmission efficiency can be improved.

Step 303: The UE determines the quantity of information bits based on the expansion factor.

Figure 4:
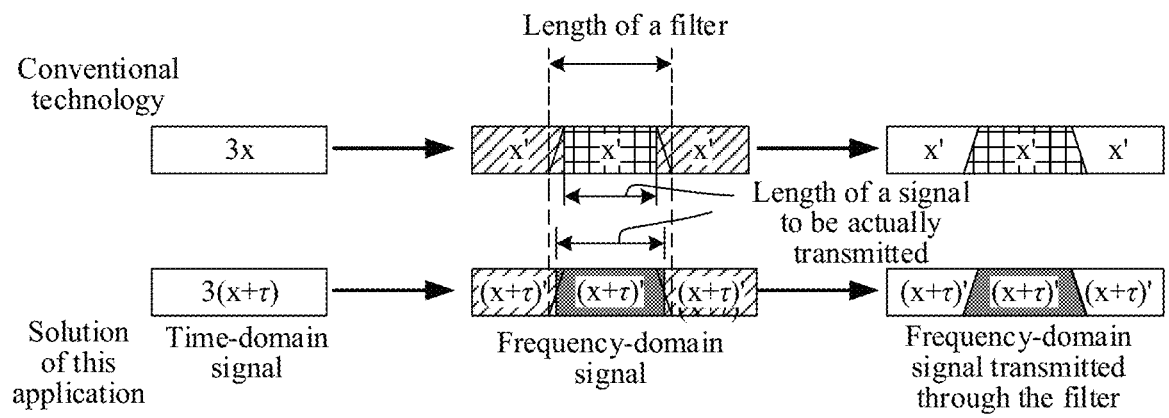
FIG. 4 is a schematic diagram of transmission of a frequency-domain signal according to an embodiment of this application.

It should be noted that the UE may determine the quantity of information bits with reference to the execution procedure of one or more of step 1 to step 5 for generating the to-be-sent signal based on the foregoing DFT-s-OFDM-FDSS. The quantity of information bits may be understood as a length of the frequency-domain signal after the filter. However, in embodiments of this application, an expansion factor is introduced, so that the length of the frequency-domain signal transmitted after the filter is increased. As shown in FIG. 4, when "faster than Nyquist" (FTN) is defined, the expansion factor $\beta$ may be indicated on the DFT-s-OFDM-FDSS. It may be learned, based on the expansion factor, that transmitted data is y=x. $\beta$, where x represents data that needs to be transmitted without being expanded, x is less than or equal to y, and $\tau$=y−x. A specific form is not limited herein, provided that a value of $\tau$ or a value of y may be derived based on values of x and $\beta$. Compared with related technology DFT-s-OFDM-FDSS, more frequency-domain signals are transmitted with a same filter length, and spectrum utilization is also significantly improved.

In an optional implementation, the UE may determine the quantity of information bits based on the expansion factor and at least one of the following parameters: a roll-off factor of a filter of the UE, a bandwidth of the UE, a quantity of streams of the signal, or an MCS.

It should be noted that the bandwidth of the UE may be a bandwidth allocated by the gNB to the UE, or may be a bandwidth actually occupied when the UE transmits data. This is not specifically limited in this application. The quantity of the streams of the signal is a quantity of signal data flows transmitted between the gNB and the UE. The MCS is a modulation and coding scheme, and transmission efficiency and quality of UE services can be ensured through by using the MCS. For example, when signal quality is good, a higher-order modulation scheme and higher coding efficiency (by adding fewer protection bits) are used, and when the channel quality is poor, a lower-order modulation scheme and lower coding efficiency (by adding more protection bits) are used.

In some embodiments of this application, when the quantity of information bits is determined based on the expansion factor, the parameters such as the roll-off factor of the filter of the UE, the bandwidth of the UE, the quantity of the streams of the signal, and the MCS are further referenced in determining the quantity of information bits, so that the reliability of the calculated quantity of data bits is higher.

In addition, on the premise that data transmission exists between the UE and the gNB, the parameters used by the UE to determine the quantity of information bits are also used by the gNB to determine the quantity of information bits. This may be agreed upon in advance by using a communication protocol. Alternatively, the gNB may directly indicate which parameters are to be used by the UE to determine the quantity of information bits. Alternatively, after the UE determines the quantity of information bits, when the UE generates the to-be-sent signal based on the quantity of information bits and transmits the to-be-sent signal, the signal carries indication information of the parameters for determining the quantity of information bits, so that the gNB knows which parameters are used to determine the quantity of information bits. There may be another manner. This is not specifically limited in this application.

For example, in this application, the quantity of information bits may be determined in one or more of the following manners:

Manner 1: The quantity of information bits is determined based on the expansion factor and the roll-off factor of the filter of the UE.

In implementation, the quantity of information bits may be determined according to Formula 1:

$$N_{info} = \text{int}\left(\beta \cdot \frac{x}{\lambda + \alpha}\right) \qquad \text{Formula 1}$$

$N_{info}$ represents the quantity of information bits, x represents a quantity of information bits transmitted according to a conventional solution, or may be a parameter obtained in another processing manner, $\beta$ represents the expansion factor, $\alpha$ represents the roll-off factor, and $\lambda$ represents the preset value.

Manner 2: The quantity of information bits is determined based on the expansion factor and the bandwidth of the UE.

In implementation, the quantity of information bits may be determined according to Formula 2:

$$N_{info} = \text{int}(\beta \cdot N_{RE} \cdot x) \qquad \text{Formula 2}$$

$N_{info}$ represents the quantity of information bits, x represents a parameter obtained based on another processing manner, $\beta$ represents the expansion factor, and $N_{RE}$ represents a quantity of subcarriers within the bandwidth.

Manner 3: The quantity of information bits is determined based on the expansion factor and the quantity of the streams of the signal.

In implementation, the quantity of information bits may be determined according to Formula 3:

$$N_{info} = \text{int}(\beta \cdot v \cdot x) \qquad \text{Formula 3}$$

$N_{info}$ represents the quantity of information bits, x represents a parameter obtained based on another processing manner, $\beta$ represents the expansion factor, and v represents the quantity of the streams of the signal.

Manner 4: The quantity of information bits is determined based on the expansion factor, the bandwidth of the UE, and the quantity of the streams of the signal.

In implementation, the quantity of information bits may be determined according to Formula 4:

$$N_{info} = \text{int}(\beta \cdot N_{RE} \cdot v \cdot x) \qquad \text{Formula 4}$$

$N_{info}$ represents the quantity of information bits, x represents a parameter obtained based on another processing manner, $\beta$ represents the expansion factor, v represents the quantity of the streams of the signal, and $N_{RE}$ represents a quantity of subcarriers within the bandwidth.

Manner 5: The quantity of information bits is determined based on the expansion factor, the roll-off factor of the filter of the UE, the bandwidth of the UE, the quantity of the streams of the signal, and the MCS.

In implementation, the quantity of information bits may be determined according to Formula 5:

$$N_{info} = \text{int}\left(\frac{N_{RE} \cdot R \cdot Q_m \cdot v}{\lambda + \alpha} \cdot \beta\right) \quad \text{Formula 5}$$

$N_{info}$ represents the quantity of information bits, $N_{RE}$ represents a quantity of Res, $\beta$ represents the expansion factor, $\alpha$ represents the roll-off factor, R represents a bit rate, $Q_m$ represents a modulation order, $v$ represents the quantity of the streams of the signal, $\lambda$ represents the preset value, int( ) represents rounding up, rounding down, or rounding off. This is not specifically limited in this application.

It should be further noted that when the expansion factor and the roll-off factor are not considered, the quantity of information bits is $N_{info}=\text{int}(N_{RE} \cdot R \cdot Q_m \cdot v)$ When the roll-off factor is considered but the expansion factor is not considered, the quantity of information bits may be determined according to Formula 6:

$$N_{info} = \text{int}\left(\frac{N_{RE} \cdot R \cdot Q_m \cdot v}{\lambda + \alpha}\right) \quad \text{Formula 6}$$

It should be noted that parameters that are in Formula 6 and that are the same as those in Formula 5 have a same meaning. Details are not described herein. It can be learned by comparing Formula 5 and Formula 6 that in this application, one more expansion factor is multiplied when the quantity of information bits is calculated. When $\beta$ is greater than 1, a value of $$\frac{N_{RE} \cdot R \cdot Q_m \cdot v}{\lambda + \alpha} \cdot \beta$$

in Formula 5 is obviously greater than a value of $$\frac{N_{RE} \cdot R \cdot Q_m \cdot v}{\lambda + \alpha},$$

that is, the quantity of information bits is increased.

In addition, in an original communication protocol, a resource allocation solution is to determine a quantity of Res based on the MCS and a quantity of PRBs allocated by the gNB. Each resource element includes one time domain symbol and one frequency domain subcarrier, $N_{RE}=\min(156,N'_{RE}) \cdot n_{PRB}$, where $N'_{RE}$ represents a quantity of Res in one PRB, $n_{PRB}$ represents a quantity of PRBs occupied by a bandwidth required for data transmission, and min represents a smaller value.

In the foregoing solution, the gNB indicates all bandwidths occupied by the UE. In an optional implementation, the gNB indicates a bandwidth for actually transmitting data by the UE. Usually, a bandwidth size is represented by using $N_{RE}$. $N_{RE}$ indicates a quantity of resource elements within a given quantity of continuous OFDM symbols. One resource element is one subcarrier in one OFDM symbol. Assuming that the quantity of the continuous OFDM symbols is given as K, a quantity of subcarriers in each OFDM is $N_{BW}=N_{RE}/$ K, a subcarrier spacing of a system is SCS, and the bandwidth is $BW=SCS \cdot N_{BW}$. Therefore, it can be learned that a system bandwidth may be derived by using $N_{RE}$, that is, may be represented by using $N_{RE}$. In this resource allocation manner, a bandwidth start position needs to be automatically expanded. $N_{RE}$ may be determined according to Formula 7:

$$N_{RE}=\text{int}(\min(N1,N'_{RE}) \cdot n_{PRB} \cdot (\lambda+\alpha)) \quad \text{Formula 7}$$

$N'_{RE}$ represents a quantity of Res in one PRB, $n_{PRB}$ represents a quantity of PRBs occupied by a bandwidth required by a modulation signal, and N1 represents a constant factor or a limiting factor agreed upon between the gNB and the UE.

In practical application, a method for determining the quantity of information bits is not limited to that provided in Manner 1 to Manner 7, and the quantity of information bits may alternatively be determined in another manner. The foregoing manners are merely example descriptions. In practical application, the foregoing different manners may be further used for weighting calculation to determine the quantity of information bits. This is not specifically limited in this application.

Step 304: The UE generates the to-be-sent signal based on the quantity of information bits.

It should be noted that in practical application, the to-be-sent signal needs to be determined by mapping the information bits into modulation symbols. The UE may first determine the quantity of information bits, map the information bits into the modulation symbols, and transmit the modulation symbols through a channel to transmit information, or may first determine the quantity of the modulation symbols, and adjust the quantity of information bits based on the determined quantity of the modulation symbols to transmit information. This application does not specifically limit whether the quantity of information bits is first determined, or the quantity of the modulation symbols is first determined.

For example, the UE may determine the quantity of the modulation symbols according to Formula 8:

$$N_{sym} = \text{int}\left(\frac{N_{RE}}{\lambda + \alpha} \cdot v \cdot \beta\right) \quad \text{Formula 8}$$

$N_{sym}$ represents the quantity of the modulation symbols, $N_{RE}$ represents a quantity of Res, $v$ represents the quantity of the streams of the signal, $\beta$ represents the expansion factor, $\alpha$ represents the roll-off factor, $\lambda$ represents the preset value, and int( ) represents rounding up, rounding down, or rounding off. This is not specifically limited in this application.

Step 305: The UE transmits the to-be-sent signal. Correspondingly, the gNB receives the to-be-sent signal.

Step 306: The gNB determines, based on the expansion factor, a quantity of information bits corresponding to the to-be-sent signal, and demodulates the to-be-sent signal.

In this application, after the UE receives the information about the expansion factor, during the spectrum replication, the UE may increase, based on the expansion factor, the quantity of information bits transmitted through the filter. The quantity of information bits transmitted through the filter is increased without sacrificing bandwidth sources, and spectrum utilization can also be correspondingly improved.

It should be further noted that the case of downlink communication is similar to that of the uplink communication. However, during the downlink communication, after receiving the information about the expansion factor from the gNB, the UE may determine, by using the expansion factor, the quantity of information bits corresponding to the to-be-sent signal only after receiving the to-be-sent signal from the gNB, so as to demodulate the signal.

Figure 5:
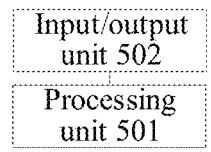
FIG. 5 is a schematic diagram of a structure of a communication apparatus according to an embodiment of this application.

Based on the same concept, an embodiment of this application provides a communication apparatus as shown in FIG. 5, including a processing unit 501 and an input/output unit 502. In practical application, the input/output unit may be implemented by using a same data processing chip, or may be implemented by using different data processing chips. This is not specifically limited in this application. The communication apparatus may be the foregoing first communication apparatus and the foregoing second communication apparatus. This is not specifically limited in this application.

When the communication apparatus is the first communication apparatus, that is, a terminal device, or the like, a first message may be received by using the input/output unit 502. The first message includes information about an expansion factor. The processing unit 501 determines a quantity of information bits based on the expansion factor, and generates a to-be-sent signal based on the quantity of information bits. The input/output unit 502 is further configured to transmit the to-be-sent signal.

It should be noted that transmission mentioned in this application may be understood as active sending, or may be understood as sending after receiving an instruction. For example, that the second communication apparatus transmits the first message may be understood as that the second communication apparatus actively sends the first message, or may be understood as that the second communication apparatus passively sends the first message after receiving an instruction of a network element of a core network, or the first message may be sent by the second communication apparatus after the first communication apparatus sends information about requesting for the first message to the second communication apparatus. A specific form of the transmission is not specifically limited in this application.

In this application, after the first communication apparatus receives the information about the expansion factor, during spectrum replication, the first communication apparatus may increase, based on the expansion factor, the quantity of information bits transmitted through a filter. The quantity of information bits transmitted through the filter is increased without sacrificing a bandwidth, and spectrum utilization can also be correspondingly improved.

In an optional implementation, the information about the expansion factor is an index value of the expansion factor.

It should be noted that there is a one-to-one correspondence between the index value of the expansion factor and a specific value of the expansion factor. The index value of the expansion factor may indicate the specific value of the expansion factor. For example, that the index value of the expansion factor is 0000 indicates that the expansion factor is 1, and that the index value of the expansion factor is 0001 indicates that the expansion factor is 11/10. This is not specifically limited in this application. Because the expansion factor is indicated by using a bit, compared with directly indicating the specific value of the expansion factor, indicating the specific value of the expansion factor by using one bit occupies less memory during data transmission, so that the first communication apparatus or the second communication apparatus can use more data processing resources to perform data computation during data processing.

However, the index value of the expansion factor may be indicated by using more than one bit. This is not specifically limited in this application.

In an optional implementation, the first message further includes information about a roll-off factor of a filter of the first communication apparatus. The expansion factor is in a one-to-one correspondence with the roll-off factor.

It should be noted that the first message includes the information about the roll-off factor of the filter of the first communication apparatus, so that the first communication apparatus calculates, by referencing the roll-off factor, the quantity of information bits based on the expansion factor. In this way, in a case in which the roll-off factor is determined, during the spectrum replication, the quantity of information bits that can be transmitted is larger without increasing the bandwidth, thereby improving spectrum utilization.

In an optional implementation, a value of the expansion factor is greater than a roll-off factor of a filter of the first communication apparatus.

In this application, the value of the expansion factor is greater than the roll-off factor, so that during the spectrum replication, it can be ensured that the quantity of information bits transmitted is larger, thereby improving spectrum utilization.

In an optional implementation, the value of the expansion factor is greater than or equal to a sum of the roll-off factor and a preset value.

It should be noted that in this application, to ensure higher spectrum utilization efficiency, a relationship between the value of the expansion factor and the roll-off factor may be limited by using the preset value. Usually, the preset value may be 1. However, in practical application, the preset value may be adjusted based on a user requirement. For example, the preset value is 1.1 or 0.9. This is not specifically limited in this application.

In an optional implementation, the information about the expansion factor is indicated by using one or more of the following signaling: RRC, a MAC CE, or DCI.

It should be noted that the RRC signaling, the MAC CE signaling, and the DCI are sent by using different layers (a control layer, a physical layer, and the like). Usually, the level of the RRC signaling is higher than that of the MAC CE signaling and the DCI, and the level of the MAC CE signaling is higher than that of the DCI. When the solution of this application is applied, the value of the expansion factor may be indicated by using any one of the foregoing signaling, or a range of the expansion factor may be indicated by using signaling of a high level, and the specific value of the expansion factor is indicated by using signaling of a low level. In this way, based on a transmission channel status, flexible scheduling may be performed, so that data transmission efficiency can be improved. For example, the second communication apparatus indicates a value range 1.1 to 1.3 of the expansion factor by using the RRC signaling, and indicates a value 1.2 of the expansion factor by using the DCI signaling. This is not specifically limited in this application.

In an optional implementation, the processing unit 501 is configured to determine the quantity of information bits based on the expansion factor and at least one of the following parameters: the roll-off factor of the filter of the first communication apparatus, a bandwidth of the first communication apparatus, a quantity of streams of the signal, or an MCS.

It should be noted that in this application, when the quantity of information bits is determined, when the expansion factor is relied upon, the parameters such as the roll-off factor of the filter of the first communication apparatus, the bandwidth of the first communication apparatus, the quantity of the streams of the signal, and the MCS are also referenced, so that reliability of a calculated quantity of data bits is higher. In addition, on the premise that data transmission exists between the first communication apparatus and the second communication apparatus, parameters used by the first communication apparatus to determine the quantity of information bits are also used by the second communication apparatus to determine the quantity of information bits. This may be agreed upon in advance by using a communication protocol. Alternatively, the second communication apparatus may directly indicate which parameters are to be used by the first communication apparatus to determine the quantity of information bits. Alternatively, after the first communication apparatus determines the quantity of information bits, when the first communication apparatus generates the to-be-sent signal based on the quantity of information bits and transmits the to-be-sent signal, the first communication apparatus carries indication information of the parameters for determining the quantity of information bits, so that the second communication apparatus knows which parameters are used to determine the quantity of information bits. There may be another manner. This is not specifically limited in this application.

In an optional implementation, the processing unit 501 is configured to determine the quantity of information bits by using the following formula:

$$N_{info} = \text{int}\left(\frac{N_{RE} \cdot R \cdot Q_m \cdot v}{\lambda + \alpha} \cdot \beta\right)$$

$N_{info}$ represents the quantity of information bits, $N_{RE}$ represents a quantity of Res, $\beta$ represents the expansion factor, $\alpha$ represents the roll-off factor, R represents a bit rate, $Q_m$ represents a modulation order, v represents a quantity of streams of the signal, $\lambda$ represents the preset value, and int( ) represents rounding up, rounding down, or rounding off.

It should be noted that the foregoing formula is merely a manner of calculating the quantity of information bits. In practical application, there may be another calculation manner. A manner of calculating the quantity of information bits falls within the protection scope of this application provided that the expansion factor is referenced in the manner.

In an optional implementation, the second communication apparatus indicates a bandwidth for actually transmitting data by the first communication apparatus. Usually, a bandwidth size is represented by using $N_{RE}$. $N_{RE}$ indicates a quantity of resource elements within a given quantity of continuous OFDM symbols. One resource element is one subcarrier in one OFDM symbol. Assuming that the quantity of the continuous OFDM symbols is given as K, a quantity of subcarriers in each OFDM is $N_{BW}=N_{RE}/K$, a subcarrier spacing of a system is SCS, and the bandwidth is BW=SCS. $N_{BW}$. Therefore, it can be learned that a system bandwidth may be derived by using $N_{RE}$, that is, may be represented by using $N_{RE}$. $N_{RE}$ may be determined by using the following formula:

$N_{RE}=\text{int}(\min(N1,N'_{RE}) \cdot n_{PRB} \cdot (2+\alpha)$

N'pr represents a quantity of Res in one physical resource block (PRB), $n_{PRB}$ represents a quantity of PRBs occupied by a bandwidth required by a modulation signal, and N1 represents a constant factor or a limitation factor agreed upon between the first communication apparatus and the second communication apparatus.

In this way, the quantity of the Res is determined in consideration of a case in which the second communication apparatus indicates only the bandwidth for actually transmitting data by the first communication apparatus. This is more comprehensive.

In an optional implementation, the processing unit 501 is configured to determine a quantity of modulation symbols by using the following formula:

$$N_{sym} = \text{int}\left(\frac{N_{RE}}{\lambda + \alpha} \cdot \beta\right)$$

$N_{sym}$ represents the quantity of the modulation symbols, $N_{RE}$ represents a quantity of resource elements (Res), $\beta$ represents the expansion factor, and $\alpha$ represents the roll-off factor.

It should be noted that in practical application, the first communication apparatus or the second communication apparatus may first determine the quantity of information bits, map the information bits into the modulation symbols, and transmit the modulation symbols through a channel to transmit information, or may first determine the quantity of the modulation symbols, and adjust the quantity of information bits based on the determined quantity of the modulation symbols to transmit information. This application does not specifically limit whether the quantity of information bits is first determined, or the quantity of the modulation symbols is first determined.

When the communication apparatus is the second communication apparatus, that is, an access network device, or the like, a first message may be determined by using the processing unit 501. The first message includes information about an expansion factor. The input/output unit 502 transmits the first message.

It should be noted that transmission mentioned in this application may be understood as active sending, or may be understood as sending after receiving an instruction. For example, that the second communication apparatus transmits the first message may be understood as that the second communication apparatus actively sends the first message, or may be understood as that the second communication apparatus passively sends the first message after receiving an instruction of a network element of a core network, or the first message may be sent by the second communication apparatus after the first communication apparatus sends information about requesting for the first message to the second communication apparatus. A specific form of the transmission is not specifically limited in this application.

In an optional implementation, the information about the expansion factor is an index value of the expansion factor.

It should be noted that there is a one-to-one correspondence between the index value of the expansion factor and a specific value of the expansion factor. The index value of the expansion factor may indicate the specific value of the expansion factor. For example, that the index value of the expansion factor is 0000 indicates that the expansion factor is 1, and that the index value of the expansion factor is 00001 indicates that the expansion factor is 11/10. This is not specifically limited in this application. Because the expansion factor is indicated by using a bit, compared with directly indicating the specific value of the expansion factor, indicating the specific value of the expansion factor by using the bit may occupy less memory during data transmission, so that the first communication apparatus or the second communication apparatus can use more data processing resources to perform data computation during data processing. In addition, the index value of the expansion factor may be indicated by using one or more bits. This is not specifically limited in this application.

In an optional implementation, the first message further includes information about a roll-off factor of a filter of the first communication apparatus. The expansion factor is in a one-to-one correspondence with the roll-off factor.

It should be noted that the first message includes the information about the roll-off factor of the filter of the first communication apparatus, so that the first communication apparatus calculates, based on the roll-off factor, the quantity of information bits based on the expansion factor. In this way, in a case in which the roll-off factor is determined during the spectrum replication, the quantity of information bits that can be transmitted is increased without increasing the bandwidth consumption, thereby improving spectrum utilization.

In an optional implementation, a value of the expansion factor is greater than a roll-off factor of a filter of the first communication apparatus.

In this application, the value of the expansion factor is greater than the roll-off factor, so that during the spectrum replication, it can be ensured that the quantity of information bits transmitted is larger, thereby improving spectrum utilization.

In an optional implementation, the value of the expansion factor is greater than or equal to a sum of the roll-off factor and a preset value.

It should be noted that in this application, to ensure higher spectrum utilization efficiency, a relationship between the value of the expansion factor and the roll-off factor may be limited by using the preset value. Usually, the preset value may be 1. However, in practical application, the preset value may be adjusted based on a user requirement. For example, the preset value is 1.1 or 0.9. This is not specifically limited in this application.

In an optional implementation, the information about the expansion factor is indicated by using one or more of the following signaling: RRC, a MAC CE, or DCI.

It should be noted that the RRC signaling, the MAC CE signaling, and the DCI are sent by using different layers (a control layer, a physical layer, and the like). Usually, the level of the RRC signaling is higher than that of the MAC CE signaling and the DCI, and the level of the MAC CE signaling is higher than that of the DCI. When the solution of this application is applied, the value of the expansion factor may be indicated by using any one of the foregoing signaling, or a range of the expansion factor may be indicated by using signaling of a high level, and the specific value of the expansion factor is indicated by using signaling of a low level. In this way, based on a transmission channel status, flexible scheduling may be performed, so that data transmission efficiency can be improved. For example, the second communication apparatus indicates a value range 1.1 to 1.3 of the expansion factor by using the RRC signaling, and indicates a value 1.2 of the expansion factor by using the DCI signaling. This is not specifically limited in this application.

In an optional implementation, the processing unit 501 is configured to determine the quantity of information bits based on the expansion factor and at least one of the following parameters: the roll-off factor of the filter of the first communication apparatus, a bandwidth of the first communication apparatus, a quantity of streams of the signal, or an MCS.

It should be noted that in this application, when the quantity of information bits is determined, when the expansion factor is relied upon, the parameters such as the roll-off factor of the filter of the first communication apparatus, the bandwidth of the first communication apparatus, the quantity of the streams of the signal, and the MCS are further referenced, so that reliability of a calculated quantity of data bits is higher. In addition, on a premise that data transmission exists between the first communication apparatus and the second communication apparatus, parameters used by the first communication apparatus to determine the quantity of information bits are also used by the second communication apparatus to determine the quantity of information bits. This may be agreed in advance by using a communication protocol. Alternatively, the second communication apparatus may directly indicate which parameters are to be used by the first communication apparatus to determine the quantity of information bits to determine. Alternatively, after the first communication apparatus determines the quantity of information bits, when the first communication apparatus generates the to-be-sent signal based on the quantity of information bits and transmits the to-be-sent signal, the signal carries indication information of the parameters for determining the quantity of information bits, so that the second communication apparatus knows which parameters are used to determine the quantity of information bits. There may be another manner. This is not specifically limited in this application.

In an optional implementation, the processing unit 501 is configured to determine the quantity of information bits by using the following formula:

$$N_{info} = int\left(\frac{N_{RE} \cdot R \cdot Q_m \cdot v}{\lambda + \alpha} \cdot \beta\right)$$

$N_{info}$ represents the quantity of information bits, $N_{RE}$ represents a quantity of Res, $\beta$ represents the expansion factor, $\alpha$ represents the roll-off factor, R represents a bit rate, $Q_m$ represents a modulation order, v represents a quantity of streams of the signal, $\lambda$ represents the preset value, and int( ) represents rounding up, rounding down, or rounding off.

It should be noted that the foregoing formula is merely a manner of calculating the quantity of information bits. In practical application, there may be another calculation manner. A manner of calculating the quantity of information bits falls within the protection scope of this application provided that the expansion factor is referenced in the manner.

In an optional implementation, the second communication apparatus indicates a bandwidth for actually transmitting data by the first communication apparatus. Usually, a bandwidth size is represented by using $N_{RE}$. $N_{RE}$ indicates a quantity of resource elements within a given quantity of continuous OFDM symbols. One resource element is one subcarrier in one OFDM symbol. Assuming that the quantity of the continuous OFDM symbols is given as K, a quantity of subcarriers in each OFDM is $N_{BW}=N_{RE}/K$, a subcarrier spacing of a system is SCS, and the bandwidth is BW=SCS·$N_{BW}$. Therefore, it can be learned that a system bandwidth may be derived by using $N_{RE}$, that is, may be represented by using $N_{RE}$. $N_{RE}$ may be determined by using the following formula:

$$N_{RE} = int(min(N1, N'_{RE}) \cdot n_{PRB} \cdot (\lambda + \alpha))$$

$N'_{RE}$ represents a quantity of Res in one physical resource block (PRB), $n_{PRB}$ represents a quantity of PRBs occupied by a bandwidth required by a modulation signal, and N1 represents a constant factor or a limitation factor agreed upon between the first communication apparatus and the second communication apparatus.

In this way, the quantity of the Res is determined in consideration of a case in which the second communication apparatus indicates only the bandwidth for actually transmitting data by the first communication apparatus. This is more comprehensive.

In an optional implementation, the processing unit 501 is configured to determine a quantity of modulation symbols by using the following formula:

$$N_{sym} = \text{int}\left(\frac{N_{RE}}{\lambda + \alpha} \cdot v \cdot \beta\right)$$

$N_{sym}$ represents the quantity of the modulation symbols, $N_{RE}$ represents a quantity of resource elements (Res), v represents a quantity of streams of the signal, β represents the expansion factor, and α represents the roll-off factor.

It should be noted that in practical application, the first communication apparatus may first determine the quantity of information bits, map the information bits into the modulation symbols, and transmit the modulation symbols through a channel to transmit information, or may first determine the quantity of the modulation symbols, and adjust the quantity of information bits based on the determined quantity of the modulation symbols to transmit information. Correspondingly, the second communication device also needs to determine the quantity of the modulation symbols, to demodulate the to-be-sent signal transmitted by the first communication device. This application does not specifically limit whether the quantity of information bits is first determined, or the quantity of the modulation symbols is first determined.

Figure 6:
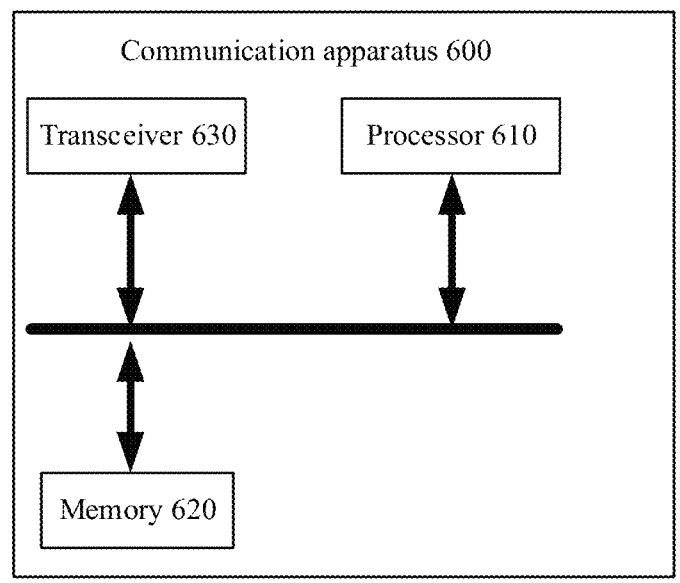
FIG. 6 is a schematic diagram of a structure of a communication apparatus according to an embodiment of this application.

In addition, as shown in FIG. 6, this application further provides a communication apparatus 600. For example, the communication apparatus 600 may be a chip or a chip system. Optionally, in this embodiment of this application, the chip system may include a chip, or may include a chip and another discrete component.

The communication apparatus 600 may include at least one processor 610. The communication apparatus 600 may further include at least one memory 620 configured to store a computer program, program instructions, and/or data. The memory 620 is coupled to the processor 610. The coupling in embodiments of this application may be an indirect coupling or a communication connection between an apparatus, a unit, or a module in an electrical form, a mechanical form, or another form, and is used for information exchange between the apparatus, the unit, or the module. The processor 610 may operate in collaboration with the memory 620. The processor 610 may execute the computer program stored in the memory 620. Optionally, the at least one memory 620 may alternatively be integrated with the processor 610.

The communication apparatus 600 may further include a transceiver 630. The communication apparatus 600 may exchange information with another device by using the transceiver 630. The transceiver 630 may be a circuit, a bus, a transceiver, or any other apparatus that may be configured to exchange information.

In a possible implementation, the communication apparatus 600 may be used in the foregoing terminal device, or may be the foregoing first communication apparatus, or may be the foregoing second communication apparatus. The memory 620 stores a computer program, program instructions, and/or data necessary for implementing a function of a relay device in any one of the foregoing embodiments. The processor 610 may execute the computer program stored in the memory 620, to complete the method in any one of the foregoing embodiments.

A specific connection medium between the transceiver 630, the processor 610, and the memory 620 is not limited in embodiments of this application. In some embodiments of this application, the memory 620, the processor 610, and the transceiver 630 are connected by using a bus in FIG. 6. The bus is represented by a bold line in FIG. 6. A manner of connection between other components is merely an example description, and is not limited thereto. The bus may be classified into an address bus, a data bus, a control bus, and the like. For ease of indications, only one bold line is used to represent the bus in FIG. 6. But this does not mean that there is only one bus or only one type of bus. In embodiments of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, the steps, and the logical block diagrams disclosed in embodiments of this application. The general-purpose processor may be a microprocessor or any conventional processor or the like. The steps of the method disclosed with reference to embodiments of this application may be directly performed and completed by using a hardware processor, or may be performed and completed by using a combination of hardware and software modules in the processor.

In embodiments of this application, the memory may be a non-volatile memory, for example, a hard disk drive (HDD) or a solid-state drive (SSD), or may be a volatile memory, for example, a random access memory (RAM). Alternatively, the memory may be any other medium that can be configured to carry or store expected program code in a form of an instruction or a data structure and that can be accessed by a computer, but is not limited thereto. Alternatively, the memory in embodiments of this application may be a circuit or any other apparatus that can implement a storage function, and is configured to store a computer program, program instructions, and/or data.

Figure 7:
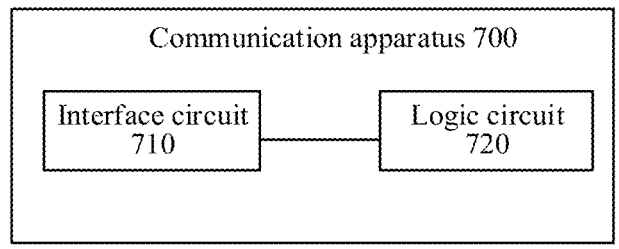
FIG. 7 is a schematic diagram of a structure of a communication apparatus according to an embodiment of this application.

Based on the foregoing embodiments, refer to FIG. 7. An embodiment of this application further provides another communication apparatus 700, including an interface circuit 710 and a logic circuit 720. The interface circuit 710 may be understood as an input/output interface, and may be configured to perform operation steps the same as those of the input/output unit shown in FIG. 5 or the transceiver shown in FIG. 6. Details are not described herein again in this application. The logic circuit 720 may be configured to run code instructions to perform the method in any one of the foregoing embodiments, and may be understood as the processing unit in FIG. 5 or the processor in FIG. 6, and may implement a same function as the processing unit or the processor. Details are not described herein in this application.

Based on the foregoing embodiments, an embodiment of this application further provides a readable storage medium. The readable storage medium stores instructions. When the instructions are executed, the communication method in any one of the foregoing embodiments is implemented. The readable storage medium may include any medium that can store program code, such as a USB flash drive, a removable hard disk drive, a read-only memory, a random access memory, a magnetic disk, or an optical disc.

A person skilled in the art should understand that embodiments of this application may be provided as a method, a system, or a computer program product. Therefore, this application may use a form of hardware-only embodiments, software-only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the apparatus (system), and the computer program product according to this application. It should be understood that computer program instructions may be used to implement each procedure and/or each block in the flowcharts and/or the block diagrams and a combination of procedures and/or blocks in the flowcharts and/or the block diagrams. These computer program instructions may be provided for a general-purpose computer, a special-purpose computer, an embedded processor, or a processor of another programmable data processing apparatus to generate a machine, so that the instructions executed by the computer or the processor of another programmable data processing apparatus generate an apparatus for implementing a specific function in one or more procedures in the flowcharts and/or in one or more blocks in the block diagrams.

These computer program instructions may alternatively be stored in a computer-readable memory that can instruct the computer or any another programmable data processing apparatus to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing apparatus, so that a series of operation steps are performed on the computer or another programmable apparatus, thereby generating computer-implemented processing. Therefore, the instructions executed on the computer or another programmable apparatus provide steps for implementing a specific function in one or more procedures in the flowcharts and/or in one or more blocks in the block diagrams.

What is claimed is:

1. A communication method, applied to a first communication apparatus, and comprising:
   receiving a first message, wherein the first message comprises information about a roll-off factor of a filter of the first communication apparatus and information about an expansion factor, the expansion factor is in one-to-one correspondence with the roll-off factor;
   determining a quantity of information bits based on the information about the expansion factor;
   generating a to-be-sent signal based on the quantity of information bits, wherein the quantity of information bits represents a length of the to-be-sent signal after passing through the filter during modulation; and
   transmitting the to-be-sent signal.

2. The method according to claim 1, wherein the information about the expansion factor is an index value of the expansion factor.

3. The method according to claim 1, wherein a value of the expansion factor is greater than the roll-off factor of the filter of the first communication apparatus.

4. The method according to claim 3, wherein the value of the expansion factor is greater than or equal to a sum of the roll-off factor and a preset value.

5. The method according to claim 4, wherein the quantity of information bits is determined by using the following formula:

$$N_{info} = \text{int}\left(\frac{N_{RE} \cdot R \cdot Q_m \cdot v}{\lambda + \alpha} \cdot \beta\right)$$

wherein $N_{info}$ represents the quantity of information bits, $N_{RE}$ represents a quantity of resource elements (REs), $\beta$ represents the expansion factor, $\alpha$ represents the roll-off factor, R represents a bit rate, $Q_m$ represents a modulation order, $v$ represents a quantity of streams of the signal, $\lambda$ represents the preset value, and int( ) represents rounding up, rounding down, or rounding off.

6. The method according to claim 1, wherein the information about the expansion factor is indicated by using one or more of the following signaling:
   radio resource control (RRC), a media access control control element (MAC CE), or downlink control information (DCI).

7. The method according to claim 1, wherein the determining the quantity of information bits based on the information about the expansion factor comprises:
   determining the quantity of information bits based on the information about the expansion factor and at least one of the following parameters:
   the roll-off factor of the filter of the first communication apparatus, a bandwidth of the first communication apparatus, a quantity of streams of the signal, or a modulation and coding scheme (MCS).

8. The method according to claim 1, wherein the value of the expansion factor is greater than or equal to a sum of the roll-off factor and a preset value.

9. A communication method, applied to a second communication apparatus, and comprising:
   determining an expansion factor, wherein the expansion factor is in one-to-one correspondence with a roll-off factor of a filter of a first communication apparatus;
   generating a first message, wherein the first message comprises information about the roll-factor and information about the expansion factor; and
   transmitting the first message to the first communication apparatus so that the first communication apparatus uses the expansion factor to determine a quantity of information bits for transmission of a signal, wherein the quantity of information bits represents a length of the signal after passing through the filter during modulation.

10. The method according to claim 9, wherein the information about the expansion factor is an index value of the expansion factor.

11. The method according to claim 9, wherein a value of the expansion factor is greater than the roll-off factor of the filter of the first communication apparatus.

12. The method according to claim 9, wherein the first message is sent by using one or more of the following signaling:
radio resource control (RRC), a media access control control element (MAC CE), and downlink control information (DCI).

13. The method according to claim 9, wherein the quantity of information bits is determined based on the expansion factor and at least one of the following parameters:
the roll-off factor of the filter of the first communication apparatus, a bandwidth of the first communication apparatus, a quantity of streams of a signal, or a modulation and coding scheme (MCS).

14. The method according to claim 13, wherein the quantity of information bits is determined by using the following formula:

$$N_{info} = \text{int}\left(\frac{N_{RE} \cdot R \cdot Q_m \cdot v}{\lambda + \alpha} \cdot \beta\right)$$

wherein $N_{info}$ represents the quantity of information bits, $N_{RE}$ represents a quantity of resource elements (REs), $\beta$ represents the expansion factor, $\alpha$ represents the roll-off factor, R represents a bit rate, $Q_m$ represents a modulation order, v represents a quantity of streams of a signal, $\lambda$ represents the preset value, and int( ) represents rounding up, rounding down, or rounding off.

15. A first communication apparatus, comprising:
an input/output circuit, configured to receive a first message, wherein the first message comprises information about a roll-off factor of a filter of the first communication apparatus and information about an expansion factor, the expansion factor is in one-to-one correspondence with the roll-off factor;
a processing circuit, configured to determine a quantity of information bits based on the expansion factor, and generate a to-be-sent signal based on the quantity of information bits, wherein the quantity of information bits represents a length of the to-be-sent signal after passing through the filter during modulation, and wherein
the input/output circuit is further configured to transmit the to-be-sent signal.

16. The apparatus according to claim 15, wherein the information about the expansion factor is an index value of the expansion factor.

17. The apparatus according to claim 15, wherein a value of the expansion factor is greater than the roll-off factor of the filter of the first communication apparatus.

18. The first communication apparatus according to claim 15, wherein the information about the expansion factor is indicated by using one or more of the following signaling:
radio resource control (RRC), a media access control control element (MAC CE), or downlink control information (DCI).

19. The first communication apparatus according to claim 15, wherein the processing circuit is configured to determine the quantity of information bits based on the information about the expansion factor and at least one of the following parameters:
the roll-off factor of the filter of the first communication apparatus, a bandwidth of the first communication apparatus, a quantity of streams of the signal, or a modulation and coding scheme (MCS).

20. The first communication apparatus according to claim 15, wherein the quantity of information bits is determined by using the following formula:

$$N_{info} = \text{int}\left(\frac{N_{RE} \cdot R \cdot Q_m \cdot v}{\lambda + \alpha} \cdot \beta\right)$$

wherein $N_{info}$ represents the quantity of information bits, $N_{RE}$ represents a quantity of resource elements (REs), $\beta$ represents the expansion factor, $\alpha$ represents the roll-off factor, R represents a bit rate, $Q_m$ represents a modulation order, v represents a quantity of streams of a signal, $\lambda$ represents the preset value, and int( ) represents rounding up, rounding down, or rounding off.

* * * * *